(12) United States Patent
Herzog et al.

(10) Patent No.: US 10,397,987 B2
(45) Date of Patent: Aug. 27, 2019

(54) INDUCTION HEATING ARRANGEMENT, METHOD FOR OPERATING AN INDUCTION HEATING ARRANGEMENT AND INDUCTION HOB

(71) Applicant: Electrolux Appliances Aktiebolag, Stockholm (SE)

(72) Inventors: Michael Herzog, Rothenburg ob der Tauber (DE); Marco Saporetti, Forli (IT); Jurgen Leikam, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 15/322,248

(22) PCT Filed: Jul. 16, 2015

(86) PCT No.: PCT/EP2015/066307
§ 371 (c)(1),
(2) Date: Dec. 27, 2016

(87) PCT Pub. No.: WO2016/030078
PCT Pub. Date: Mar. 3, 2016

(65) Prior Publication Data
US 2017/0142783 A1 May 18, 2017

(30) Foreign Application Priority Data

Aug. 26, 2014 (EP) ..................................... 14182298
Aug. 26, 2014 (EP) ..................................... 14182299

(51) Int. Cl.
*H05B 6/12* (2006.01)
*H05B 6/06* (2006.01)

(52) U.S. Cl.
CPC ........... *H05B 6/1272* (2013.01); *H05B 6/062* (2013.01); *H05B 6/065* (2013.01); *H05B 6/1254* (2013.01);
(Continued)

(58) Field of Classification Search
CPC .... H05B 6/065; H05B 6/1254; H05B 6/1272; H05B 6/1245; H05B 2206/022; H05B 6/062; Y02B 40/126; Y10S 99/14
(Continued)

(56) References Cited

U.S. PATENT DOCUMENTS 4,792,652 A * 12/1988 Seguy .................... H05B 6/065
219/624
8,350,194 B2 * 1/2013 Lee ...................... H05B 6/1272
219/460.1
(Continued)

FOREIGN PATENT DOCUMENTS

DE 102009019765 A1 11/2010
EP 2170010 A2 3/2010
(Continued)

OTHER PUBLICATIONS

International Search Report and Written Opinion issued in corresponding PCT Application No. PCT/EP2015/066307 dated Nov. 12, 2015, 10 pages.
International Search Report & Written Opinion issued in PCT Application No. PCT/EP2015/066309 dated dated Oct. 28, 2015, 12 pages.

* cited by examiner

*Primary Examiner* — Alexander M Valvis
(74) *Attorney, Agent, or Firm* — Pearne & Gordon LLP

(57) ABSTRACT

The invention conceives an induction heating arrangement (1000) comprising four coils of a smaller diameter (1100, . . . , 1400) and a coil having a larger diameter (1500).

(Continued)

The coils are arranged on a first plane (2100) and on a second plane (2200). In order to adapt a cooking area (1600) to the size of a pot, either the larger coil (1500) or one or more of the smaller coils (1100, 1400) are operated. A power supply circuitry (2400) is shared between the coils of the two planes and a selector (2300) takes care of disconnecting a respective coil of the plane of coils that is not operated in order to avoid coupling and interference and loss of energy. The guiding elements of the magnetic flux (1110, 1115, 1540) are used to confine the magnetic field in the area of the pot. The method of operating the induction heating arrangement takes care of efficient energy use, and an induction hob (3000) includes the induction heating arrangement.

19 Claims, 2 Drawing Sheets

(52) U.S. Cl.
CPC ....... *H05B 2206/022* (2013.01); *Y02B 40/126* (2013.01)

(58) Field of Classification Search
USPC .................................................. 219/622, 624
See application file for complete search history.

(56) References Cited

U.S. PATENT DOCUMENTS

| 8,791,398 | B2* | 7/2014 | De la Cuerda Ortin ................... H05B 6/062 219/620 |
| 8,878,108 | B2* | 11/2014 | Kitaizumi ............ H05B 6/1245 126/220 |
| 9,277,598 | B2* | 3/2016 | Lee ....................... H05B 6/1263 |
| 2011/0100980 | A1* | 5/2011 | Kitaizumi ............ H05B 6/1245 219/624 |
| 2017/0156180 | A1* | 6/2017 | Herzog ................ H05B 6/1272 |

FOREIGN PATENT DOCUMENTS

| EP | 2405715 A1 | 1/2012 |
| EP | 2265088 B1 | 6/2012 |
| JP | 2005302406 A | 10/2005 |
| WO | 2011067708 A1 | 6/2011 |

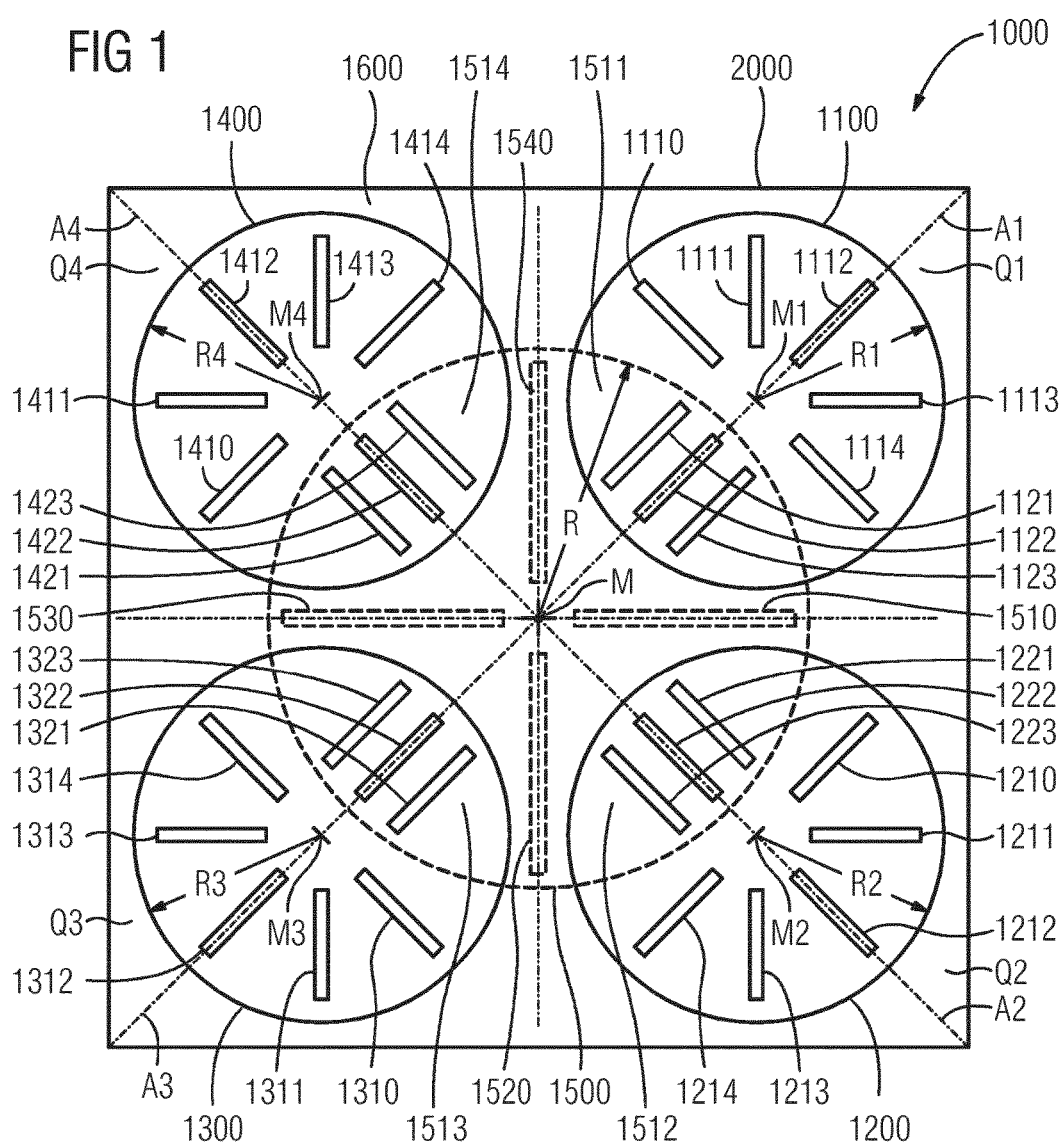
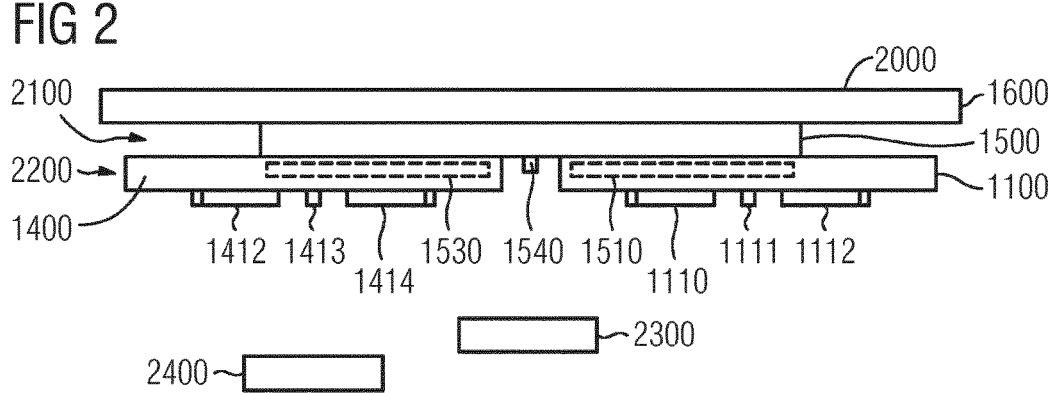

INDUCTION HEATING ARRANGEMENT, METHOD FOR OPERATING AN INDUCTION HEATING ARRANGEMENT AND INDUCTION HOB

The invention relates to an induction heating arrangement, method for operating an induction heating arrangement and an induction cooking hob.

In modern household environments, such as kitchen environments, a reason to buy new household appliances is better usability, energy efficiency and a more flexible use of the devices. Thus, the technical focus on developments in this area is directed to improvements regarding usability, energy efficiency and flexibility of the devices.

In the area of cooking hobs, induction heating has become widely available in recent years. A general problem with induction heaters is, however, that the induction coils are located underneath a plate, e.g. a glass ceramic plate and that it is generally difficult to align pots of different sizes exactly to the field of an induction coil in order to maximize the energy transfer from the high-frequency electromagnetic field into the metallic pot.

On the other hand, there are plenty of pots with different shapes, e.g. for fish or for roasts, that widely extend over the area of traditional circular heaters.

There is thus a strong need with induction hobs to be able to flexibly adapt to a pot size and to a pot position of a pot on a surface or top plate of an induction kitchen hob.

Further, there is a need to save as much energy as possible because energy is a costly resource and fossil energy is only limited.

DE 10 2009 019 765 A1 discloses an induction heating arrangement for a grill with several induction coils being arranged under a plate. In one embodiment (FIG. 5) a central first induction coil is surrounded symmetrically by three second induction coils having a smaller diameter than the first induction coil. The first coil and the second coils are operated at the same time to provide a homogeneous induction field and uniform heating for the grill placed upon the plate. Magnetic flux guiding elements are provided in the grill but not described in the coils.

In EP 2 265 088 B1 it is disclosed to use an array of circular induction coils arranged in two different layers whereby the arrays in the different layers are horizontally displaced against each other to improve induction power coverage in the cooking field. Depending on the position of a pot on the induction cooking area, induction coils beneath the pot of either one or the other layer are used. In order to avoid interference between the induction coils of the different layers, only coils of one layer are used at a time, which also allows it to reduce the number of power supplies required for the operation of the induction cooking field. All coils are preferably of the same diameter.

The invention is based on the problem to provide a flexible induction heating with high energy efficiency and comfortable use.

In an embodiment of the invention an induction heating arrangement, may comprise:
- a first induction coil having a first diameter and being arranged in a first plane;
- at least two second, in particular three and preferably four, induction coils having at least one second diameter and being arranged in a second plane, wherein each second diameter is smaller than the first diameter, i.e. the first induction coil has a larger diameter than each of the second coils;
- the second induction coils being arranged around (or: encircling or surrounding) the first induction coil or, in other words, the first induction coil being arranged in a centre of the arrangement of the second induction coils, and each of the second induction coils partially overlapping with the first induction coil;
- a selector or control device configured to operate, including to electrically connect to a power supply, either, in a first operational state, the first induction coil, while not operating, preferably electrically disconnecting, any of the second induction coils or, in a second operational state, to operate, including to electrically connect to a power supply, at least one of the second induction coils while not operating, preferably electrically disconnecting, the first induction coil.

The selector or control device in particular selects or operates only the first induction coil or at least one of the second coils but not the first induction coil together with one or more of the second induction coils.

A coil being "arranged in a plane" is to be interpreted in such a way that the coil extends along that plane with the plane passing through the coil. Of course the coil is a three-dimensional technical object and not two-dimensional like a geometrical plane. The expression "in a first (second) plane" could also be replaced in all claims and embodiments by "at a first (second) height" or by "on a respective first (second) level".

The diameter of the coil can be defined as the largest distance between two boundary points of the coil, e.g. in case of a circular coil twice the radius and in case of a square coil the length of the diagonal.

By the technical measures described the induction heating arrangement can be used for differently sized objects, in particular pans or pots, objects with larger diameter on the first coil and, also several, objects with smaller diameter on the second induction coils but there is still a saving in power and energy consumption and a good efficiency as the overlapping coils will not be operated at the same time and thus electromagnetic losses avoided.

The electromagnetic losses by induced currents are in particular reduced in the preferred embodiment where the coil(s) not operated are electrically disconnected in the respective operational state so that no induced current can flow in or out of the non-operated coil(s).

Each induction coil may define a respective heating zone for an object, in particular a cooking vessel or cooking good carrier, which is usually placed on a support plate or surface above the coil.

Advantageously, the induction heating arrangement according to an embodiment of the present invention combines a larger coil in one plane with at least two, preferably four, smaller coils in another plane. In this manner, a traditional hob configuration having four cooking zones can be constructed while at the same time a larger pot can be accommodated by a larger induction coil.

Beneficially, electromagnetical interference is prevented or at least reduced by disconnecting the coils of one plane by means of the selector which maximizes the energy efficiency and at the same time reduces the maximum number of power supply circuitries. In one embodiment the induction heating arrangement comprises at least one power supply for the induction coils, being controlled by the selector or control device, wherein the selector or control device, in the first operational state, electrically connects the first induction coil and electrically disconnects all second induction coils to or from the respective power supply and, in the second operational state, electrically connects at least one of the second induction coils and electrically disconnects the first induction coil to or from the respective power supply. That way an electrical current induced by the operated coil cannot flow in or out the disconnected coil and thus energy losses are further reduced. Preferably the number of power supplies is smaller than the number of induction coils.

In an advantageous embodiment centres or centre points of all second induction coils lie outside of the first induction coil and/or outside of the overlapping regions. Furthermore, preferably each overlapping region comprises less than 50% and/or less than 180° angular sector of the corresponding second induction coil. This allows for the remaining larger section of the coils to be constructed in a conventional way in particular equipped with magnetic flux guiding element.

Preferably at least two, in particular all, second induction coils have the same diameter.

In general all induction coils are of circular shape, but other shapes like oval or ellipsoidal or polygonal (e.g. triangular, rectangular, hexagonal) shapes are also possible.

In a preferred embodiment, being in particular suitable for a conventional cooking hob, at least four second induction coils are provided each being arranged in a corresponding quadrant of a rectangular or square shaped heating area defining heating zones. The first induction coil is then arranged around a centre of the heating area and extends into each of the quadrants and defines another, central heating zone.

Beneficially, according to a further embodiment of the induction heating arrangement according to the present invention, it is equipped with a power supply circuitry, wherein the power supply circuitry can serve induction coils on one plane and equally a larger induction coil on another plane. Thus, the number of power supply circuitry required in this induction heating arrangement is less than the number of induction coils used depending on the number of coils allocated to the different planes.

Beneficially, according to a further embodiment of the induction heating arrangement according to the present invention, the number of power supply circuitry is lower than the number of induction coils used in the induction heating arrangement, whereas by use of the selector, the induction coils of one plane are disconnected and thus require no power supply circuitry. A lower number of circuits improves the reliability and facilitates the manufacturing of the induction heating arrangement, as lesser parts require less manufacturing effort and entail lower costs.

The selector or control device is preferably coupled to a user input selecting device, comprising any kind of actuating or interacting element(s) such as rotary or pushing or sliding knobs or buttons or switches or touch elements or touch screens etc. to select the first induction coil and respective heating zone or one or more of the second induction coils or heating zones, in particular separately or individually.

Advantageously, according to a further embodiment of the induction heating arrangement according to the present invention, guiding elements for the magnetic flux is provided. In this manner, magnetic field lines can be focused to the area where they are needed for heating and thus the energy efficiency is increased, as more of the magnetic field lines enter an object such as pot to be heated.

Advantageously, according to a further embodiment of the induction heating arrangement according to the present invention, plural guiding elements for the magnetic flux are provided that are associated to a respective individual induction coil. In this manner, the magnetic field distribution of the magnetic heating arrangement can be fine-tuned without using extra coils and a homogeneous field distribution can be maintained requiring fewer coils, less power supply circuitry and this by making better use of the energy consumed by the induction heating arrangement.

Preferably, according to a further embodiment of the induction heating arrangement according to the present invention, a guiding element for the magnetic flux associated to a respective induction coil is arranged next to it respectively below it in order to further improve the concentration of the magnetic field lines and thus the energy transfer capability of the induction heating arrangement.

In a preferred embodiment which can be claimed independently also there are arranged in each overlapping region of two induction coils at least two, preferably three, guiding elements for the magnetic flux, preferably in a radial direction or displaced to and parallel to a radial direction of at least one of the two overlapping coils. Preferably these guiding elements do not extend over the boundary of the respective overlapping region. This help to further concentrate the magnetic field lines of the respective induction coils when in use and in particular to concentrate the magnetic field in the area of the induction coil with the larger diameter.

Beneficially, according to a further embodiment of the induction heating arrangement according to the present invention, the length of a guiding element for the magnetic flux corresponds to the expansion of a respective induction coil. In this manner, the magnetic field distribution across the induction heating arrangement can be further optimized and tailored according to the need in current kitchen appliances. Also, it can be further optimized in terms of avoiding interference between the corresponding induction coils.

Beneficially, according to a further embodiment of the induction heating arrangement according to the present invention, the induction coil having a larger diameter comprises guiding elements for the magnetic flux having a different length. In this manner, the extension of the larger induction coil can be optimally exploited, while at the same time guiding elements for the magnetic flux can be used that are part of the induction coils having a smaller diameter in an area of overlap to focus the magnetic field and homogenize the magnetic field distribution over the induction coil having a larger diameter.

Beneficially, according to a further embodiment of the induction heating arrangement according to the present invention, the guiding elements for the magnetic flux associated to the first induction coil with a larger diameter are arranged outside the area of the second induction coils having a smaller diameter or outside of the overlapping regions. In this manner, the induction coils having a smaller diameter can be shielded against each other, and the magnetic field lines associated to the respective induction coils having a smaller diameter can be concentrated further in the area of the respective smaller induction coils. In this manner, the energy efficiency is further increased and the magnetic field lines are further concentrated in the area where the pot is supposed to be as in traditional heating zones.

Advantageously, according to a further embodiment of the induction heating arrangement according to the present invention, the guiding element for the magnetic flux is ferrite, as ferrite is a material widely available and suitable to guiding element magnetic field lines in household appliances in a particular manner.

The induction heating arrangement may comprise a support plate with a support surface for placing an object to be heated such as a cooking vessel or cooking good carrier.

The first induction coil may be arranged on a lower surface of the support plate facing away from the support surface and in particular applied thereonto as a structured layer or as a pre-manufactured part, e.g. by gluing.

Preferably the second induction coils are arranged further below the plate than the first induction coil, in particular attached or arranged at a lower surface of the first induction coil.

The guiding elements in each overlapping region may be fixed to the corresponding second induction coil, preferably at a lower side or surface facing away from the first induction coil and/or the support plate.

Outside of the overlapping regions the induction coils may be provided with at least three further guiding elements for the magnetic flux, preferably each being arranged in a radial direction of the respective induction coil and preferably being fixed, e.g. glued, to the respective induction coil, esp. at its underside.

Beneficially, according to a further embodiment of the induction heating arrangement according to the present invention, this is arranged beneath a pot support, whereas the induction coil having a larger diameter is arranged on the pot support. In this manner, parts are saved and the distance to the cooking area is as short as possible.

Advantageously, an embodiment of the method for operating a heating arrangement according to the present invention allows it to either operate the first induction coil or the induction coil having a larger diameter or a respective one or more of the second induction coils having a smaller diameter. In this manner, an optimum area coverage of the magnetic field on a cooking area can be achieved, while at the same time the number of power supply circuitry required for the operation of the respective induction coils can be minimized.

Beneficially, according to a further embodiment of the method for operating an induction heating arrangement according to the present invention it comprises a power supply circuitry that is shared between induction coils on a different plane or between first and second induction coils. In this manner, the number of power supply circuitry required for operating the induction hob can further be minimized.

Beneficially, an induction cooking hob according to the present invention comprises an induction heating arrangement according to the present invention, because in this manner a flexible reliable and power-saving induction hob can be realized that is attractive for a potential customer.

The invention will, in the following, be explained further on the basis of examples shown in drawings, wherein:

FIG. 1 shows an induction heating arrangement according to an embodiment of the present invention;

FIG. 2 shows a side view of an induction heating arrangement of FIG. 1;

Same parts are referenced by the same reference numerals.

Figure 3:
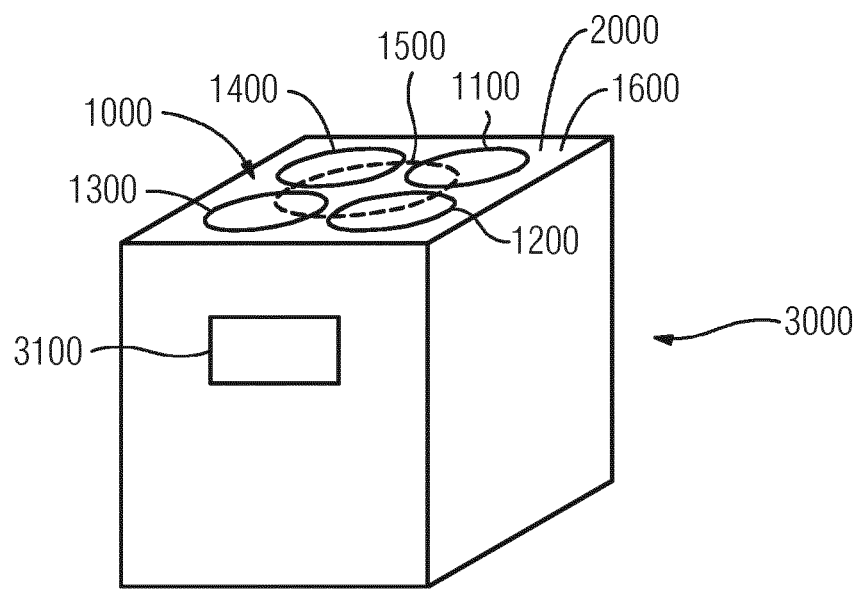
FIG. 3 depicts an induction hob according to an embodiment of the present invention.

As FIG. 1 shows, an induction heating arrangement 1000, which is preferably used for or comprised by an induction cooking hob, comprises a, preferably rectangular shaped, in particular square shaped, heating, in particular cooking, area 2000, which is usually covered by a plate 1600, e.g. made of glass ceramics.

The rectangular, in particular square shaped heating, in particular cooking, area 2000 has four quadrants Q1, Q2, Q3 and Q4 the diagonals of which reaching from the centre of the heating area 2000 M to the respective corner being designated by A1, A2, A3 and A4 respectively. In the middle of the heating area a, preferably single, first induction coil 1500 is located having a centre M that preferably is positioned at the centre of the heating area 2000 and preferably being of circular shape with a radius R around the centre M and thus a diameter of 2R.

Preferably in each quadrant Q1 to Q4 an individual respective second induction coil 1100 in Q1, 1200 in Q2, 1300 in Q3 and 1400 in Q4 is arranged, which is preferably of circular shape, the respective coil centres being designated by M1, M2, M3 and M4 and respective coil radii being designated by R1, R2, R3 and R4 respectively. In the embodiment shown all radii R1 to R4 and thus diameters are equal, i.e. the second induction coils are of the same size, however also at least one of them can differ also, for instance two coils, e.g. opposite ones like 1100 and 1300 having one size or diameter and the other two another diameter or radius as is a known configuration in traditional cooking hobs.

Each line going through the centre M or M1 to M4 defines a radial direction for the respective coil.

In this symmetric embodiment shown each centre M1 to M4 of a second induction coil 1100, 1200, 1300 or 1400 coincides with a centre of the respective quadrant and lies, like the centre M of the first induction coil 1500, on the respective diagonal A1 to A4, in fact in its middle, and, further, the diagonals A1 to A4 of the quadrants coincide with or are coaxial with radial directions of the first induction coil 1500 as well as of the respective second induction coil 1100, 1200, 1300 or 1400 in the respective quadrant Q1 to Q4.

As can further be seen, the first induction coil 1500 and each of the second induction coils 1100, 1200, 1300 and 1400 overlap horizontally or in radial directions and, for this reason, are arranged in different planes or at different heights or levels, as will be further apparent from FIG. 2. The inner first induction coil 1500, in its plane, extends further outwardly into to region above or below each of the second induction coils in their respective plane, thus resulting in an overlapping of the coils in a projection orthogonal to their planes. The second induction coil 1100 overlaps with the first induction coil 1500 in an overlapping region (or: area) 1511, The second induction coil 1200 overlaps with the first induction coil 1500 in an overlapping region (or: area) 1511, the second induction coil 1300 overlaps with the first induction coil 1500 in an overlapping region (or: area) 1513 and the second induction coil 1400 overlaps with the first induction coil 1500 in an overlapping region (or: area) 1514.

The radius R or diameter 2R of the inner first induction coil 1500 is chosen larger than the maximum of all radii R1 to R4 of the second induction coils 1100 to 1400 but also smaller than the minimum of all distances of the centre M of the first induction coil 1500 to the centres M1 to M4 of the second induction coils 1100 to 1400. This means that all centres M1 to M4 of the second induction coils 1100 to 1400 lie outside of and are not covered by the first induction coil 1500 and, thus, the overlapping regions 1511 to 1514 cover less than 50% of the area and less than 180° of the angular section of the corresponding second induction coils 1100 to 1400. This allows for the remaining non overlapping areas of more than 50% and angular sections of more than 180° of the second induction coils to be equipped with magnetic flux guiding elements in a conventional manner, preferably in radial direction, as will be explained later.

The second induction coils 1100, 1200, 1300 and 1400 are, thus, arranged in a classical cooking hob pattern occupying quadrants Q1 to Q4 of a rectangular or square shaped cooking area 2000, which is usually covered by a hob plate

1600. Each of these coils and quadrants defines a cooking zone for placing a respective cooking vessel, wherein each cooking zone can be used and controlled separately.

However, in addition to this classical pattern of quadrant cooking zones the first larger induction coil 1500 is provided around the centre of the cooking area stretching or extending out into each of the quadrants thereby overlapping each second induction coil and defining another, here fifth, cooking zone which is larger than the four other cooking zones and allows for larger cooking vessels to be placed onto the plate 2000 in its middle. When the first induction coil 1500 and its larger central cooking zone is operated the other cooking zones are inoperable or not in use, preferably electrically disconnected, at the same time, so that in the overlapping regions undesired effects on the induction field and inductive energy losses are avoided.

However, beside the classical quadrant configuration, any other configuration and number of smaller induction coils surrounding the inner larger induction coil is conceivable as needed at the customer's premises, for instance two or three outer cooking zones or second induction coils with a central larger cooking zone or first induction coil.

Further, it can be seen that in this embodiment, which can also be considered to be a preferred embodiment, guiding elements for the magnetic field lines respectively the magnetic flux are provided associated to respective induction coils.

In particular, each of the smaller second induction coils 1100, 1200, 1300 and 1400 is equipped with guiding elements for magnetic flux, which are preferably fixed to, e.g. glued to, the underside facing away from the first induction coil 1500 of the respective second induction coil 1100 to 1400.

In the embodiment shown in FIG. 1, for each second coil 1100 to 1400, there are, outside of the corresponding overlapping region 1511 to 1514, several, preferably five, guiding elements 1110, 1111, 1112, 1113 and 1114 of coil 1100 and 1211, 1212, 1213 and 1214 of coil 1200 and 1311, 1312, 1313 and 1314 of coil 1300 and 1411, 1412, 1413 and 1414 of coil 1400 arranged in a radial pattern. Each one of the guiding elements extends radially with respect to the respective centre M1, M2, M3 or M4 and preferably has a length, preferably the same length, which is smaller than the radius R1, R2, R3 or R4, and preferably the same width, and preferably has a linear or straight shape. Preferably two of the guiding elements, e.g. 1110 and 1114, are arranged diametrically to each other and orthogonally to the axis A1, A2, A3 or A4 and a third one, e.g. 1112, on and along the axis A1 to A4 and two more, e.g. 1111 and 1113, are arranged in between two guiding elements, e.g. 1110 and 1112 or 1112 and 1114, at an angle of 45° left and right of the axis A1 to A4, to provide for preferably an equiangular radial arrangement. The number and angular distance and the length or width of the guiding elements can of course be chosen differently.

In the overlapping regions 1511 to 1514, however, the guiding elements for the magnetic flux are arranged in a different pattern, as they will be functionally shared by the two overlapping coils in their respective operational modes. Preferably the second coils are equipped with these guiding elements for the overlapping regions, for instance by fixing the guiding elements at the underside of the second coils.

In the embodiment shown three guiding elements are arranged in each overlapping region 1511 to 1514. A middle guiding element 1122, 1222, 1322 and 1422 is arranged on and along the axis A1 to A4 and radially to the centre M1 to M4 diametrically to the guiding element 1112, 1212, 1312 and 1412 for each second coil and adjacent to and parallel to the middle guiding element 1122, 1212, 1312 and 1412 two guiding elements 1121 and 1123, 1221 and 1223, 1321 and 1323 and 1421 and 1423 are arranged symmetrically to the respective axis A1 to A4 and/or at the same distance to the middle guiding element. In particular, by this special pattern, the magnetic field emanated by the induction coil having a larger diameter 1500 can be further focused in the area of the induction coil which allows it to improve the energy efficiency and to increase the number of field lines that enter a pot placed in the area of the induction coil 1500 with a larger diameter.

In general, other numbers and patterns of guiding elements in the overlapping regions can be chosen, but usually the number of guiding elements is at least two and at least one of the guiding elements is arranged radially or in a radial direction to the centre of at least one of the overlapping coils or at least parallel to such a radial direction.

As further is depicted, in the area of the first induction coil 1500 having a larger diameter outside of the overlapping regions 1511 to 1514, preferably further, e.g. four, guiding elements 1510 to 1540 for the magnetic flux are provided which are arranged radially with respect to the centre M and preferably equiangularly, e.g. at an angle of 90° displaced to each other. The guiding elements 1510 to 1540 may reach over a large portion of the radius R, e.g. 90% or even 95%, and in between the overlapping regions 1511 to 1514 outwardly and in particular may be arranged at an angle of 45° to the neighbouring axes A1 to A4 respectively.

In this manner, the magnetic field emanated by the larger induction coil 1500 can be further homogenized, while at the same time interference between the induction coils having a smaller diameter 1100, . . . , 1400 can be prevented, respectively the magnetic fields emanated by respective smaller induction coils 1100, . . . , 1400 can be focused and confined to the quadrant of the heating arrangement where they are located.

In particular, the second induction coils having a smaller diameter may have a diameter of 200 mm or 205 mm or 210 mm, whereas the first induction coil may have a a diameter of 275 mm or 280 mm or 285 mm.

Beneficially, the induction coil having a larger diameter 1500 is applied directly in the form of a metallic coating to the, e.g. glass ceramic, plate 1600 supporting the induction heating arrangement.

As FIG. 2 shows, a side view of the induction heating arrangement according to an embodiment of the present invention comprises similar parts as shown in FIG. 1.

The first induction coil 1500 is arranged, preferably glued or applied as a layer, directly under the plate 1600 at its underside. The magnetic guiding elements 1540 and 1510 and 1530 and 1520 (nit shown in FIG. 2) are placed underneath the first induction coil 1500, preferably fixed e.g. glued to the induction coil 1500 directly. Also, in this view, two second induction coils with a smaller diameter 1400 and 1100 are depicted. It can be observed that the smaller induction coils 1100 and 1400 each overlap with the larger induction coil 1500 and that they are applied directly underneath the first induction coil 1500 in order to emanate the magnetic field lines as close as possible to the plate 1600 where the pots are supposed to be placed.

Further, two planes 2100, 2200 are depicted. Each plane 2100 and 2200 receives a respective induction coil/group of induction coils. Plane 2100 here is the plane where the larger induction coil 1500 is located and plane 2200 here is the plane where the four smaller induction coils 1400 to 1100 are located. Further, a selector (or: selecting device) 2300 is depicted and the energy supply circuitry 2400. Those devices are in a known manner connected to the induction coils 1100 to 1500. The purpose of the selector 2300 is to disconnect an induction coil located on a respective plane, once an induction coil on another plane is operated. In this manner, less power supply circuitry 2400 is needed in order to supply the induction coils of the respective induction heating arrangement and electromagnetic coupling effects as well as interference are avoided.

The problem of properly covering the area where the pot is located is in particular solved in a manner of allocating induction coils to different planes, whereas a larger induction coil 1500 is used to heat larger pots located on the plate 1600, one or more of the smaller induction coils 1100 to 1400 are used to cook in smaller pots located on quadrants Q1 to Q4 of the plate 1600.

Also plural or several induction coils 1100 to 1400 can be grouped together in order to operate neighboring induction coils, e.g. 1100 and 1200, as a common cooking zone to support a lengthy or oblong pot or cooking vessel thereon.

As FIG. 3 shows, the induction hob 3000 comprises an induction heating arrangement 1000 according to the present invention having second induction coils with a smaller diameter 1100 to 1400, a glass ceramic plate 1600 and a first induction coil having a larger diameter 1500.

The induction hob 3000 further comprises a control and display device 3100 for the user to manually control the operation of the induction hob 3000. In particular, the control and display device 3100 may issue user control commands to the selector 2300 and may be allocating power supply circuitry 2400. In particular, the operation of the induction hob 3000 may be controlled in such a manner that once the induction coil having the larger diameter 1500 is operated in a first operational state or mode, at least one, preferably all second induction coils having a smaller diameter 1100, 1200, 1300, 1400 is or are disconnected from the power supply in order to avoid interference respectively coupling in of electromagnetic waves into the smaller coils and heating of the smaller coils by the larger coil. The same takes place in a second operational state or mode for the coil having a larger diameter 1500, which is disconnected once the second coils in the second plane 2200 are operated. The control and display device 3100 preferably only allows for a user to select either the first cooking zone and its associated first induction coil 1500 or, alternatively, one or more of the second induction coils 1100 to 1400 as single or combined cooking zones.

Figure 4:
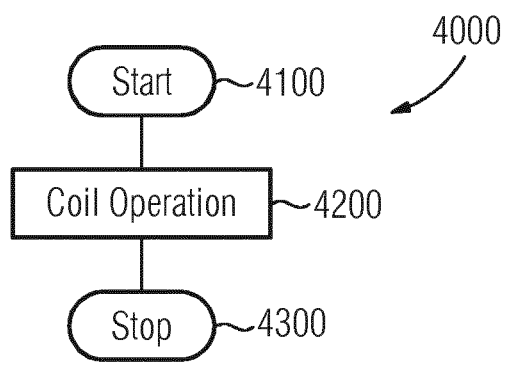
FIG. 4 shows a method for operating an induction heating arrangement.

As FIG. 4 shows, the method 4000 for operating an induction heating arrangement for e.g. the induction hob 3000 comprises a minimum number of steps 4100, 4200, 4300. At 4100 the method is started, e.g. by a user activating the induction hob 3000. At 4200 it is ensured, that e.g. the induction coils 1100 to 1500 on one of the planes 2100 or 2200 are exclusively operated. The non operated induction coils maybe completely disconnected from power respectively short circuited e.g. by the selector 2300. The number of power supply circuitry can be minimized and the coupling and interference between the coils 1100 to 1500 can be reduced. At 4300 the method is ended, e.g. by a user switching off the induction hob 3000.

LIST OF REFERENCE NUMERALS

1000 induction heating arrangement
1100, 1200, 1300, 1400 second induction coils
1500 first induction coil
1511 to 1514 overlapping region
1600 support plate
1111 to 1114, 1120 to 1123 guiding elements for magnetic flux
1211 to 1214, 1220 to 1223 guiding elements for magnetic flux
1311 to 1314, 1320 to 1323 guiding elements for magnetic flux
1411 to 1414, 1420 to 1423 guiding elements for magnetic flux
1510, 1520, 1530, 1540 guiding elements for magnetic flux
2000 heating/cooking area
2100 first plane
2200 second plane
2300 selector
2400 power supply
3000 induction hob
3100 control and display device
4000 operation method
4100, 4200, 4300 method steps
A1, A2, A3, A4 diagonal axis
M, M1, M2, M3, M4 centre
Q1, Q2, Q3, Q4 quadrant
R1, R2, R3, R4 radius

The invention claimed is:

1. An induction heating arrangement, comprising:
a first induction coil having a first diameter and being arranged in a first plane;
at least two second induction coils having at least one second diameter and being arranged in a second plane, wherein each second diameter is smaller than the first diameter;
the second induction coils being arranged around the first induction coil and each of the second induction coils partially overlapping with the first induction coil in respective overlapping regions;
a control device configured to operate either, in a first operational state, the first induction coil while not operating any of the second induction coils or, in a second operational state, at least one of the second induction coils while not operating the first induction coil; and
a plurality of guide elements for a magnetic flux operatively associated with each of said respective induction coils, each said guide element comprising ferrite, wherein all of the plurality of guide elements operatively associated with the first induction coil are arranged outside the overlapping regions, and
wherein in each said overlapping region at least one of said guide elements for the magnetic flux operatively associated with the respective second induction coil is arranged radially aligned with a centre of the first induction coil and a centre of the respective second induction coil, and at least two of said guide elements for the magnetic flux operatively associated with the respective second induction coil are parallel to each other.

2. The induction heating arrangement according to claim 1, further comprising at least one power supply for the first induction coil and the at least two second induction coils, said at least one power supply being controlled by the control device, wherein the control device, in the first operational state, electrically connects the first induction coil and electrically disconnects all second induction coils to or from the at least one power supply and, in the second operational state, electrically connects at least one of the second induction coils and electrically disconnects the first induction coil to or from the at least one power supply.

3. The induction heating arrangement according to claim 1, wherein centres of all the second induction coils lie outside the overlapping regions.

4. The induction heating arrangement according to claim 1, wherein at least two of the second induction coils have the same diameter and/or size and/or wherein at least one of the induction coils is or are of circular shape.

5. The induction heating arrangement according to claim 1, wherein at least four of said second induction coils are provided each being arranged in a corresponding quadrant of a rectangular or square shaped heating area defining respective heating zones, and the first induction coil is arranged around a centre of the heating area extending into each of the quadrants and defining another central heating zone.

6. The induction heating arrangement according to claim 1, wherein the guide elements in each said overlapping region are fixed to the corresponding second induction coil.

7. The induction heating arrangement according to claim 1, wherein outside of the overlapping regions the second induction coils each are provided with at least three guide elements for the magnetic flux.

8. The induction heating arrangement according to claim 1, further comprising a support plate for an object to be heated, wherein the first induction coil is arranged on a lower surface of the support plate, and wherein the second induction coils are arranged further below the support plate.

9. A method for operating the induction heating arrangement according to claim 1, wherein either the first induction coil is operated or at least one of the second induction coils is operated.

10. The method for operating an induction heating arrangement according to claim 9, wherein at least one power supply circuitry is shared between induction coils of two planes, or the first induction coil and the second induction coils.

11. An induction cooking hob comprising the induction heating arrangement according to claim 1.

12. The induction heating arrangement according to claim 2, wherein the number of power supplies is smaller than the number of induction coils.

13. The induction heating arrangement according to claim 1, said guide elements for the magnetic flux being arranged next to and/or below the respective induction coil.

14. The induction heating arrangement according to claim 1, said at least two of said guide elements not extending over a boundary of the respective overlapping region.

15. The induction heating arrangement according to claim 6, said guide elements in each overlapping region being fixed to the corresponding second induction coil at a lower side thereof facing away from the first induction coil.

16. The induction heating arrangement according to claim 7, said at least three guide elements provided to each of the induction coils outside the overlapping regions being arranged in a radial direction of the respective induction coil.

17. The induction heating arrangement according to claim 8, said first induction coil being applied onto said support plate as a structured layer or as a pre-manufactured part.

18. The induction heating arrangement according to claim 8, said second induction coils being attached at a lower surface of the first induction coil.

19. The induction heating arrangement according to claim 1, wherein each overlapping region comprises less than 50% and less than 180° angular sector of the corresponding second induction coil.

\* \* \* \* \*